US005963275A

United States Patent [19]

Cho

[11] Patent Number: 5,963,275

[45] Date of Patent: Oct. 5, 1999

[54] DEVICE FOR FIXING VIDEO CIRCUIT BOARD OF MONITOR

[75] Inventor: Nam-Ill Cho, Suwon-si, Rep. of Korea

[73] Assignee: SamSung Electronics Co., Ltd., Suwon, Rep. of Korea

[21] Appl. No.: 08/886,000

[22] Filed: Jun. 30, 1997

[30] Foreign Application Priority Data

Jun. 29, 1996 [KR] Rep. of Korea .......................... 96-18936

[51] Int. Cl.[6] .......................... H04N 5/64

[52] U.S. Cl. .......................... 348/836; 348/843

[58] Field of Search .......................... 348/836, 839, 348/843; 403/328, 329, 326; 24/297

[56] References Cited

U.S. PATENT DOCUMENTS

| | | | |
|---|---|---|---|
| 4,338,635 | 7/1982 | Haider et al. | 348/836 |
| 4,579,473 | 4/1986 | Brugger | 24/297 X |
| 4,590,540 | 5/1986 | Nicholson et al. | 348/836 X |
| 4,768,704 | 9/1988 | Beckway et al. | 24/297 X |
| 4,903,541 | 2/1990 | Shiota | 403/329 X |
| 5,065,490 | 11/1991 | Wivagg et al. | 24/297 X |
| 5,321,516 | 6/1994 | Chen | 348/825 |
| 5,691,781 | 11/1997 | Siccardo | 348/836 X |
| 5,745,348 | 4/1998 | Cha | 361/815 |
| 5,777,699 | 7/1998 | Shim | 348/830 |

*Primary Examiner*—Peter M. Cuomo
*Assistant Examiner*—Hanh V. Tran
*Attorney, Agent, or Firm*—Robert E. Bushnell, Esq.

[57] ABSTRACT

A device for fixing a video circuit board of a monitor includes a CRT having a CRT terminals in the neck thereof. A neck cap is attached to the neck and having a guide flange and a pair of fastening snaps. A socket has connection holes into which the CRT terminals are inserted, connection pins soldered to the video circuit board, and a central hole through which the guide flange passes. The video circuit board is soldered to the connection pins of the socket. This has a snap through hole corresponding to the central hole.

20 Claims, 5 Drawing Sheets

20 25 26 32 30 33 40 42 11 12 21 23 22 24 27 31 32

40
42
33
30
32
32
26
31
27
25
24
22
20
23
21
12
11

DEVICE FOR FIXING VIDEO CIRCUIT BOARD OF MONITOR

This application makes reference to, incorporates the same herein, and claims all benefits accruing under 35 U.S.C. §119 from an application entitled Device For Fixing Video Circuit Board of Monitor earlier filed in the Korean Industrial Property Office on Jun. 29, 1996, and there duly assigned Ser. No. 96-18936 by that Office.

BACKGROUND OF THE INVENTION

1. Field of the Invention

The present invention relates to a device for fixing a video circuit board to the rear of the CRT's neck in a monitor. More particularly, to a device for fixing a video circuit board of a monitor which is contrived to firmly mount the video circuit board without using an adhesive and detach it from the monitor.

2. Discussion of Related Art

To detach a video circuit board, especially during repairing the product unit or in a production line, a considerably strong compulsory force must be applied to break the silicon bond between the neck cap and socket. This compulsory force applied can deflect or damage the CRT terminal that is as much important as the CRT, thereby resulting in a considerable loss of economy. Thus, an effective device for fixing a video circuit board in a monitor is necessary.

SUMMARY OF THE INVENTION

Thus, the present invention is to provide an improved device for fixing a video circuit board in a monitor that substantially obviates one or more of the problems due to limitations and disadvantages of the related art.

An object of the present invention is to provide a device for firmly and easily fixing a video circuit board at the rear of the CRT's neck in a monitor.

Another object of the present invention is to provide a device for fixing a video circuit board, with which the video circuit board can be easily detached—without any damage of the CRT terminals.

To achieve these and other advantages and in accordance with the principles of the present invention. A device for fixing a video circuit board of a monitor may include a CRT having a CRT terminals in the neck thereof, a neck cap attached to the neck and having a guide flange and a pair of fastening snaps, and a socket having connection holes into which the CRT terminals are inserted. Connection pins may be soldered to the video circuit board. A central hole permits the guide flange to pass. And the video circuit board is soldered to the connection pins of the socket and has a snap through hole corresponding to the central hole.

BRIEF DESCRIPTION OF THE ATTACHED DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENT

Reference will now be made in detail to the preferred embodiments of the present invention examples of which are illustrated in the accompanying drawings.

Figure 1:
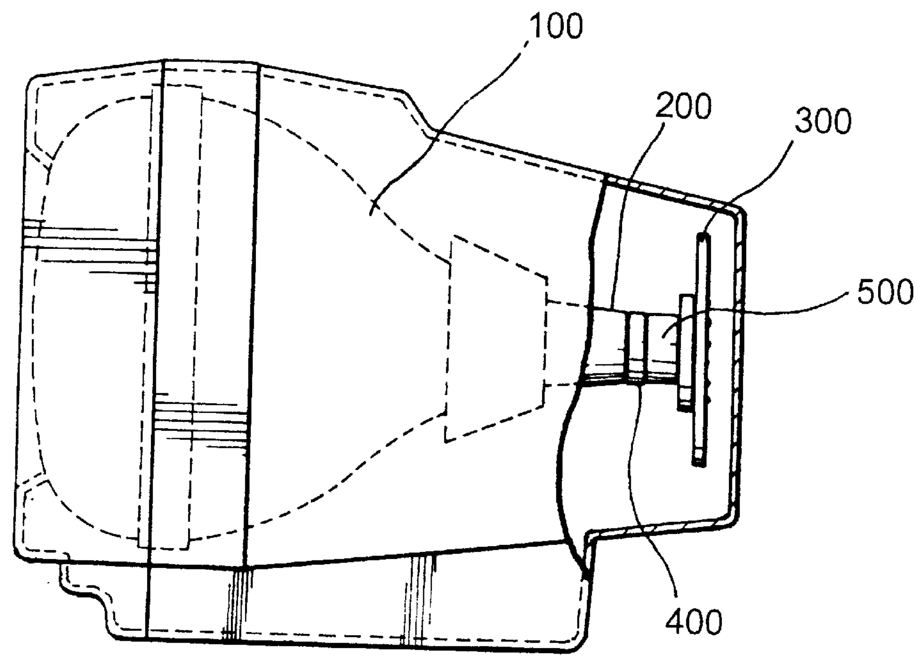
FIG. 1 is a partly sectional side view illustrating a monitor to show a prior art device for fixing a video circuit board.
Figure 2:
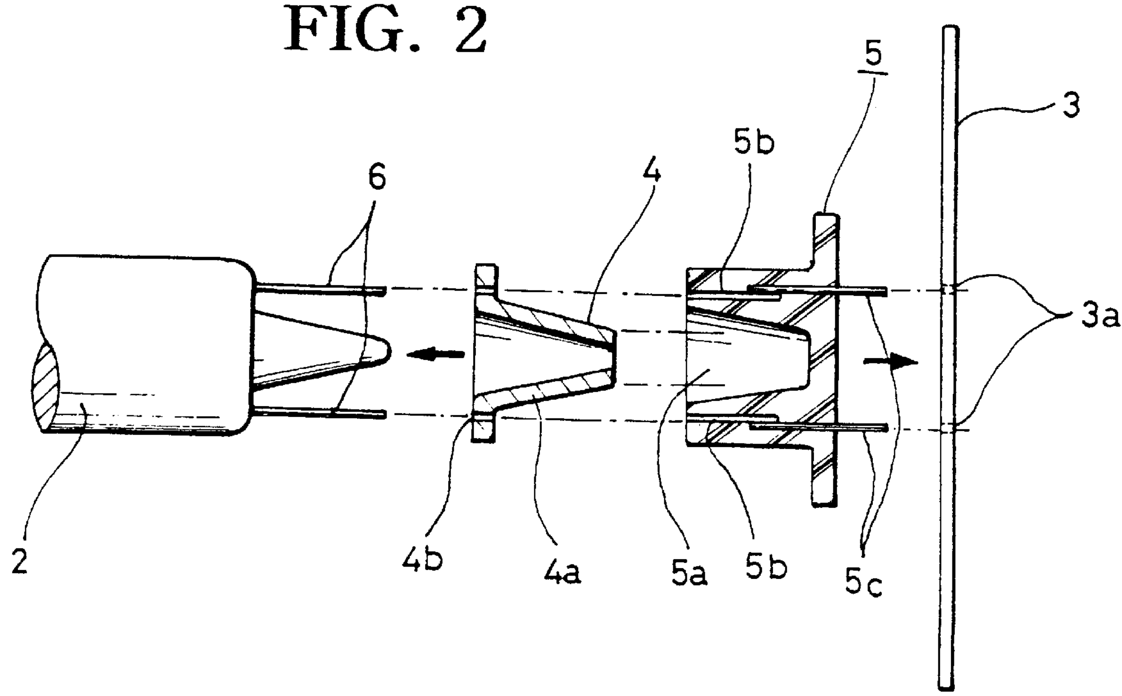
FIG. 2 is an exploded sectional view illustrating a separation of a device for fixing a video circuit board.
Figure 3:
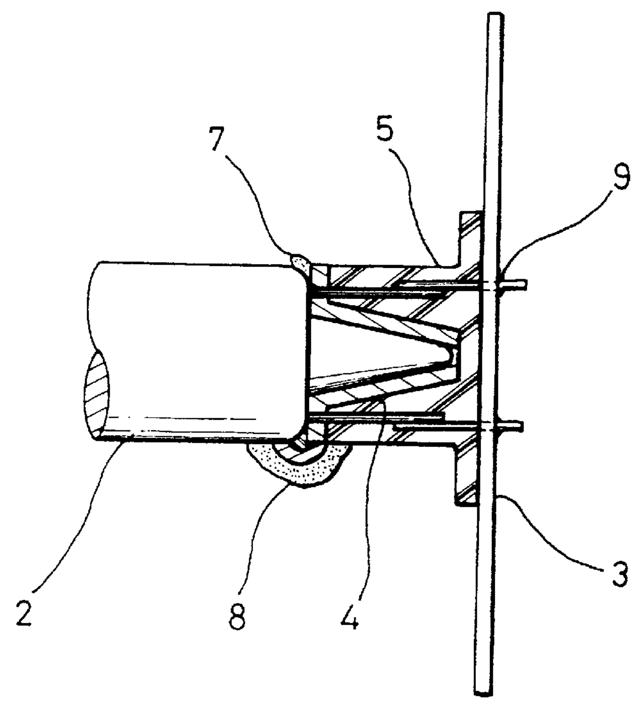
FIG. 3 is a sectional view illustrating an assemblage of the device as shown in FIG. 2.
Figure 4:
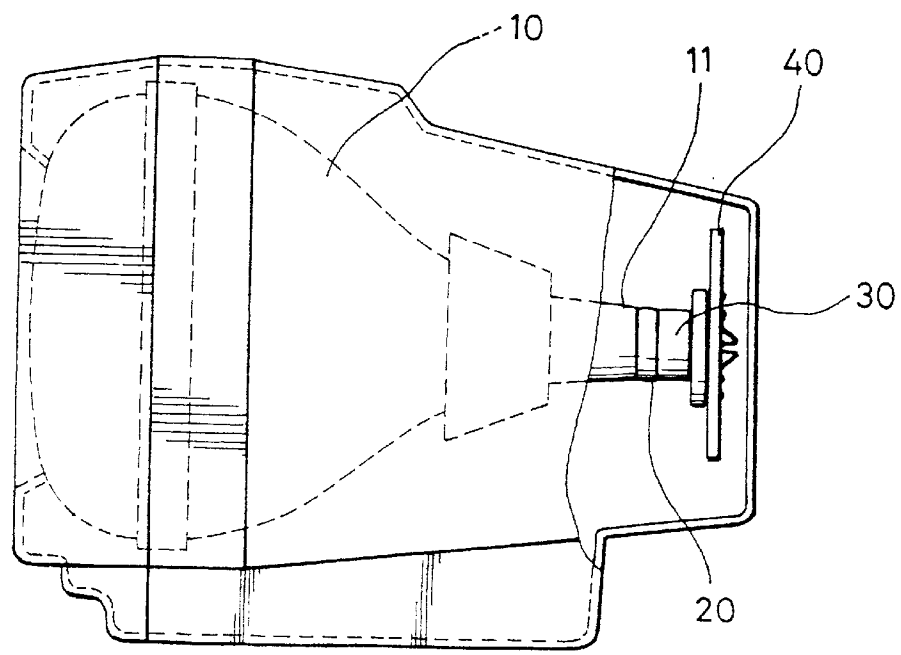
FIG. 4 is a partly sectional side view illustrating a monitor a device for fixing a video circuit board in accordance with the present invention.
Figure 5:
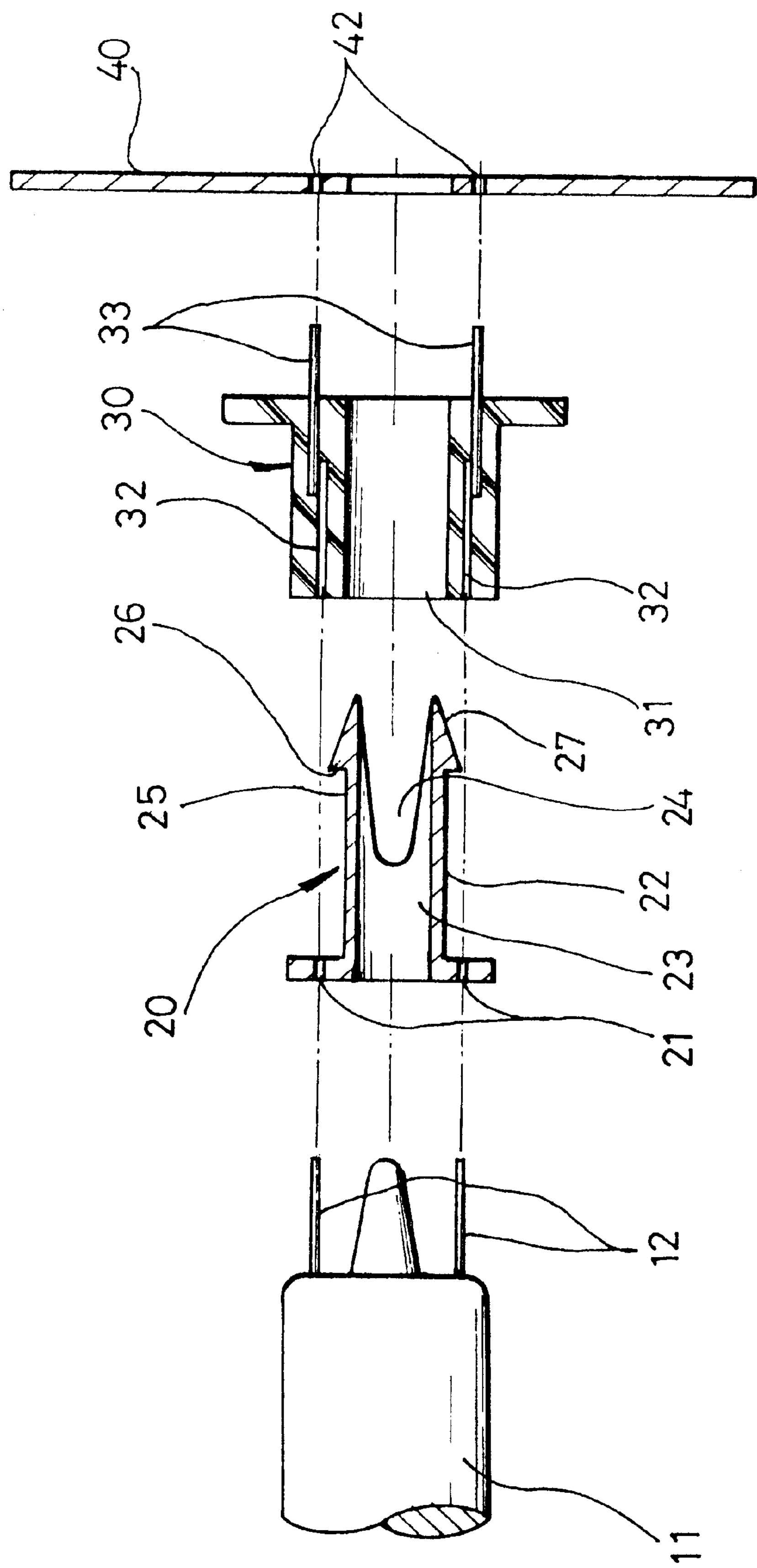
FIG. 5 is an exploded view illustrating a separation of the device for fixing a video circuit board in accordance with the present invention.

Turn now to FIG. 1, which shows a partly sectional side view illustrating a monitor to show a prior art device for fixing a video circuit board. Typically, a monitor has a video circuit board that is fixed to the rear of the CRT's neck, as shown in FIG. 1. Referring to FIG. 1, the monitor has a cathode ray tube (CRT) 100 that is made of glass material, and a video circuit board 30 fixed to the neck 200 by using a neck cap 400 and a socket 500. The neck cap 400 and socket 500 are molded from plastic material under the necessity of minimizing the load of components acting toward the rear of the neck. This is because the neck provides only a small area for fixing other components thereto but it must support a video circuit board that is excessively heavy and large. Turn now to FIG. 2, which illustrates an explode sectional view illustrating a separation of a device for fixing a video circuit board. In addition, turn to FIG. 3, which shows a sectional view illustrating an assemlage of the device shown in FIG. 2. The FIGS. 2 and 3 include a neck 2 of a cathode ray tube (not shown). In addition, FIG. 2 includes a neck cap 4, a socket 5, and a video circuit board 3. The neck cap 4 and socket 5 have a guide flange **4*a* and guide groove 5*a*, respectively. The neck cap 4 has terminal holes 4*b* into which CRT terminals 6 are inserted. An adhesive 7 is then applied to bond the neck cap 4 and neck 2. The video circuit board 3 has a printed circuit diagram thereon and a plurality of pin holes 3*a* formed to connect circuits on the board 3**.

The socket 5 has a plurality of connection holes **5*b* into which the CRT terminals 6 of the neck 2 are inserted, and a plurality of connection pins 5*c* externally projected from the connection holes 5*b*. The connection pins 5*c* of the socket 5 are inserted into the pin holes 3*a* formed in the video circuit board 3. They are soldered to the circuit board 3, forming a soldered section 9. With this, a first assemblage of the video circuit board 3** is completed.

The CRT terminals 6 are inserted into the connection holes **5*b*, so that the socket 5 is unstably coupled to the neck cap 4 by a weak supporting force of the CRT terminals 6**.

Under a heavy load of the circuit board 3, such an unstable coupling between the socket 5 and neck cap 4 may cause an escape of the socket 5 out of the CRT terminals 6 and a damage of the neck 2. To prevent the socket 5 from being separated from the neck cap 4, a silicon bond 8 may be applied between them.

It is not easy to apply the silicon bond 8 because the neck cap 4 and socket 5 are relatively small in diameter but the video circuit board 3 is very bulky with a cover for a shielding.

The silicon bond 8 has not a strong adhesive strength enough to resist a slack load of the heavier circuit board 3, so that the socket 5 may be separated from the neck cap 4.

A device for fixing a video circuit board of a monitor according to the principles of present invention is illustrated in FIGS. 4 to 9. The device for fixing a video circuit board comprises a CRT 10 having a neck 11 at the rear part thereof, a neck cap 20 attached to the rear of the neck 11, a socket 30 fixed to the neck cap 20, and a video circuit board 40 firstly coupled to the socket 30. The neck 11 of the CRT 10 has a plurality of CRT terminals 12 projecting along the length of the neck 11.

Figure 6:
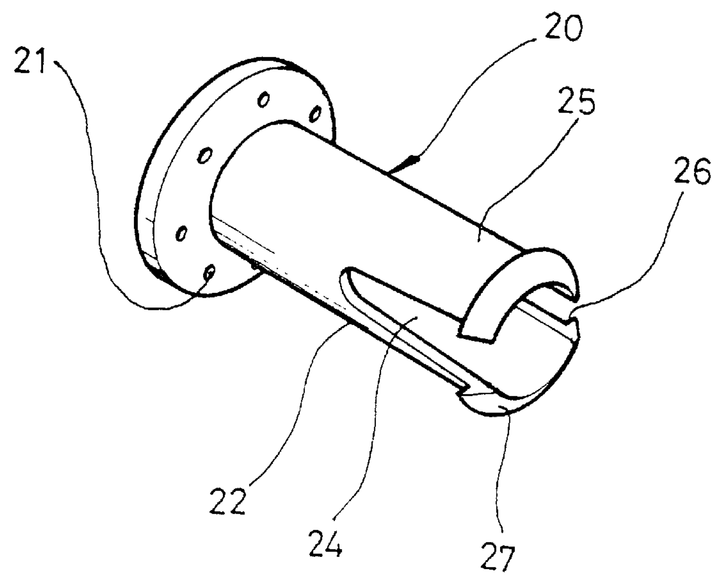
FIG. 6 is a perspective view illustrating a neck cap according to the present invention.

As shown in FIG. 6, the neck cap 20 comprises terminal holes 21 into which the CRT terminals 12 are inserted, and a guide flange 22 projecting lengthwise in the center of it. The guide flange 22 comprises a cavity 23 in the center thereof and snap pieces 25 divided by a splitting groove 24 at the sharp end portion thereof. Fastening snaps 27 having rims 26 are externally formed at the end of the snap pieces 25 toward the socket 30.

The socket 30 comprises a central hole 31 for the guide flange 22 to pass therethrough. Connection holes 32 are formed around the central hole 31 for the CRT terminals 12 to be inserted thereinto, and connection pins 33 electrically connected to the CRT terminals 12.

The video circuit board 40 to be assembled with the socket includes a snap through hole 41 corresponding to the central hole 31. Pin holes 42 are formed around the snap through hole 41 for the connection pins 33 to be inserted thereinto and soldered.

Figure 7:
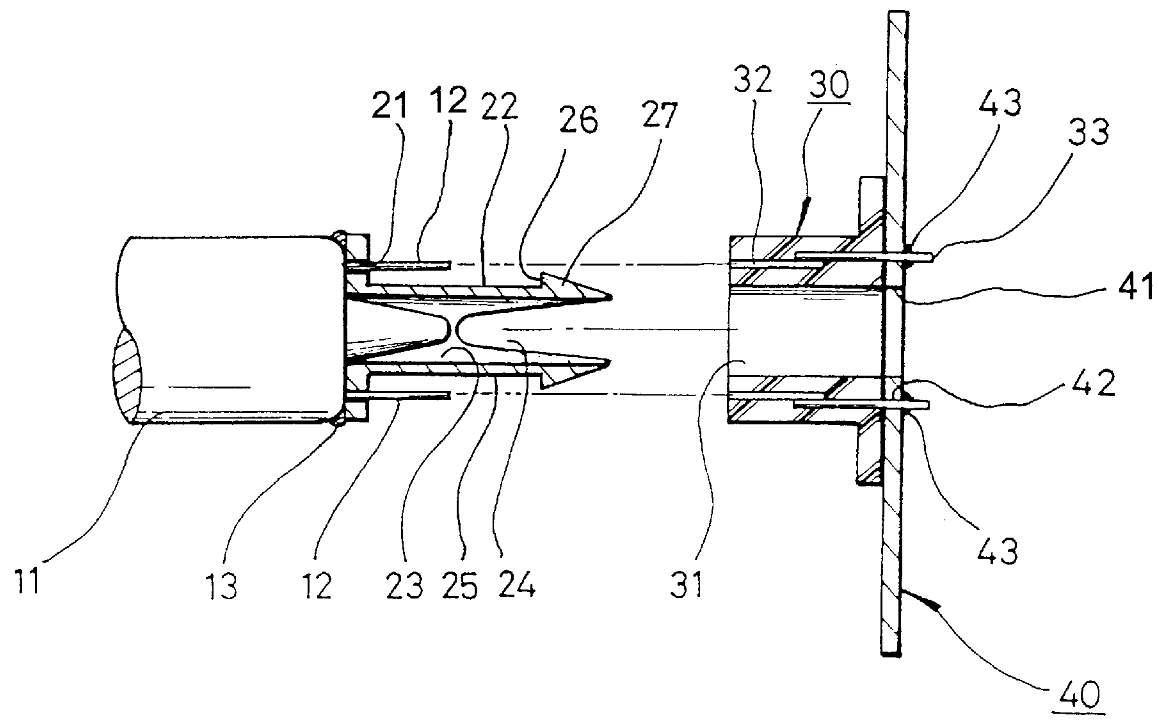
FIG. 7 is an exploded view illustrating a first assemblage of the device for fixing a video circuit board in accordance with the present invention.
Figure 8:
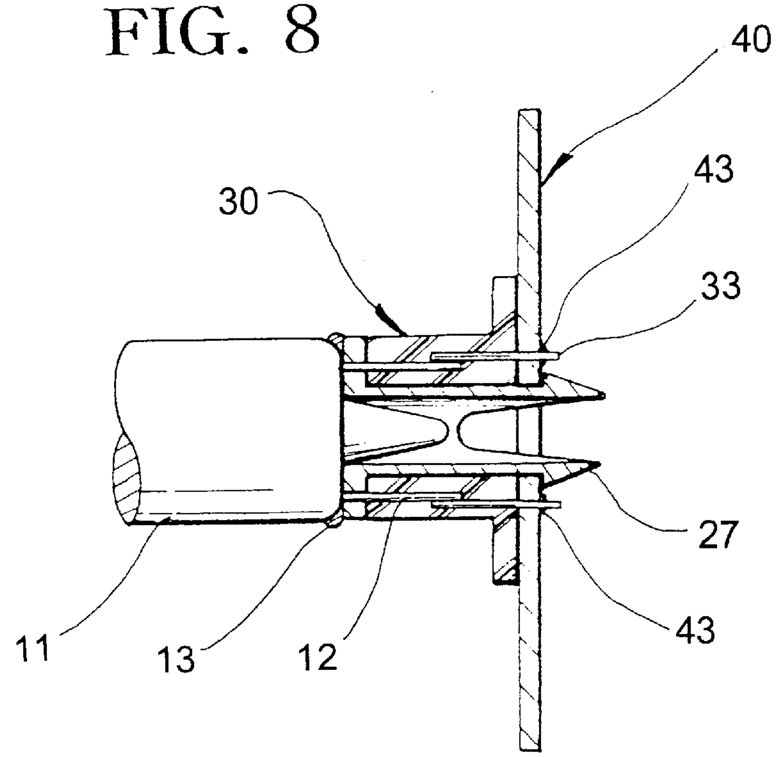
FIG. 8 is a side view illustrating a second assemblage of the device for fixing a video circuit board in accordance with the present invention.

The operation and effect of device according to the present invention can be as shown in FIGS. 7 and 8. In a first assemblage as shown in FIG. 7, the neck cap 20 is coupled to the neck 11 of the CRT 10 and the CRT terminals 12 are inserted into the terminal holes 21. An adhesive 13 is applied between them. The video circuit board 40 is associated with the socket 30 in order for the connection pins 33 to fit the pin holes 42, and soldered to the connection pins 33 to form a soldered section 43.

A secondary assemblage is described with reference to FIG. 8, coupling the socket 30 having the video circuit board 40 with the neck cap 20 fixed to the neck 11 of the CRT 10. The guide flange 22 of the neck cap 20 is first inserted into the central hole 31 of the socket 30. Because the central hole 31 is slightly smaller than the circumference formed by the fastening snaps 27 of the guide flange 22, the fastening snaps 27 must be closed up inside to pass through the central hole 31.

At the moment that the fastening snaps 27 are inserted into a snap through hole 41 through the central hole 31, the binding force closing up the fastening snaps 27 disappears. Thus the fastening snaps 27 elastically become open and the video circuit board 40 is hooked by rims 26. While the video circuit board 40 is fixed by the fastening snaps 27, the CRT terminals 12 are inserted into the connection holes 32 and the video circuit board 40 is fixed to the neck 11. The guide flange 22 of the neck cap 20 that is fixed to the neck 11 gives a support to the socket 30 and video circuit board 40. It brings an effect of dispersing the load of the video circuit board 40 and alleviates a slack load in the contact between the neck cap 20 and socket 30. As a result, the video circuit board 40 is firmly fastened to the socket 30 including the contact portion with two binding forces of the video circuit board 40 and fastening snaps 27.

Even when other components are mounted to the video circuit board 40, the load of the components cannot force the video circuit board 40 to escape from the neck 11. This is because the video circuit board 40 is supported by the guide flange 22 of the neck cap 20 and firmly fastened by the rims 26 of the fastening snaps 27.

Figure 9:
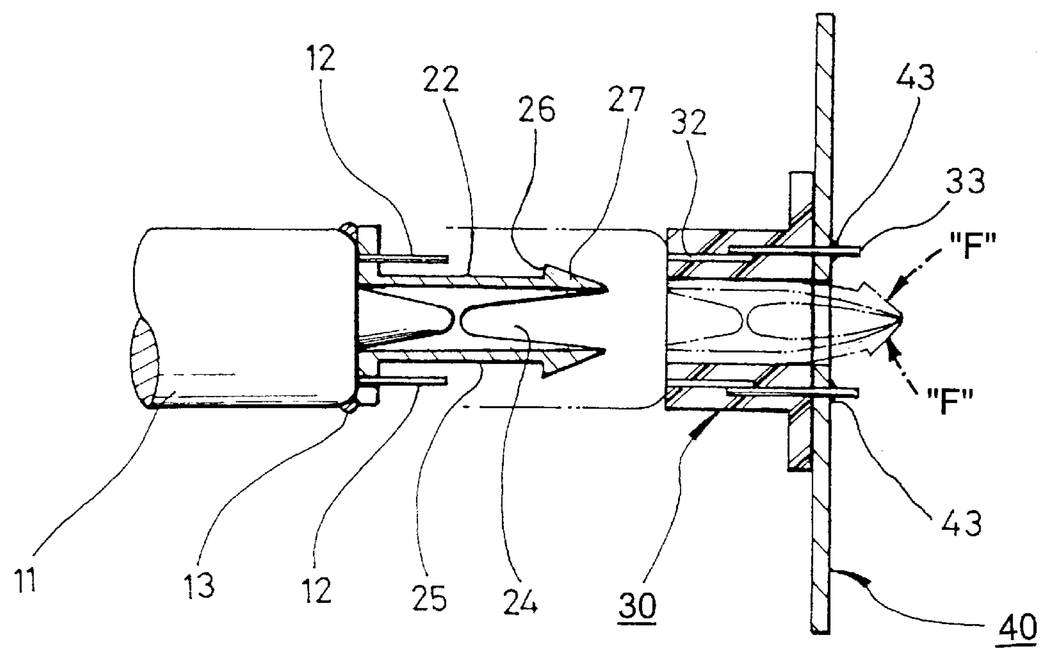
FIG. 9 is a side view illustrating a detachment of the device for fixing a video circuit board in accordance with the present invention.

FIG. 9 shows a detachment of the video circuit board 40 under the necessity of repairing the product unit or in a production line. Press the fastening snaps 27 to close up the rims 26 inside the snap through hole 41 and externally pull out the neck cap 20 from the socket 30 fastened to the video circuit board 40. The video circuit board 40 and the neck cap 20 are easily detached by getting the fastening snaps 27 out of the central hole 31.

The neck cap 20 must be pulled out horizontally while being separated from the video circuit board 40, because the guide flange 22 of the neck cap 20 is horizontally formed. The CRT terminals 12 can be separated straightly from the connection holes 32 of the socket 30 without a deflection of the CRT terminals 12 damage of the CRT terminals 12 and neck 11. In addition, the neck cap can include a pair of fastening snaps being inserted into the neck of the video display serve to fasten the neck to the neck cap.

As stated as described above, a video circuit board of the present invention can be easily fixed to the neck of the CRT without using a separate adhesive. This results in a remarkable increase of productivity especially in a mass production. It is possible to prevent an escape of the video circuit board without using a silicon bond. The video circuit board can also be detached easily and reassembled without any deformation or damage of the neck and CRT terminals, thereby drastically eliminating defect factors and enhancing a reliability of the products.

It will be apparent to those skilled in the art that various modifications and variations can be made in the device for fixing a video circuit board in a monitor of the present invention without departing from the spirit or scope of the invention. Thus, it is intended that the present invention cover the modifications and variations of this invention provided they come within the scope of the appended claims and their equivalents.

What is claimed is:

1. A device comprising:

a video display having a first side conveying varying visual information to a user and having a second side forming a neck, said second side being opposite to said first side;

at least one neck terminal being mounted at said neck and being electrically conductive;

a video circuit board having at least one electronic component mounted thereon and forming an orifice;

a neck cap being coupled to said neck of said video display and being disposed between said neck and said video circuit board;

a guide flange formed on said neck cap; and a fastening unit formed on said guide flange, said fastening unit being received by said orifice of said video circuit board to thereby couple said neck of said video display to said video circuit board, said at least one neck terminal being electrically coupled to said at least one electronic component of said video circuit board, said fastening unit engaging said video circuit board, said fastening unit being formed to enable said neck of said video display to be easily coupled to said video circuit board and being formed to enable said neck of said video display to be easily separated from said video circuit board, wherein said guide flange aids in supporting a mass of said video circuit board.

2. The device of claim 1, further comprising a socket unit being coupled to said video circuit board, said socket unit being disposed between said video circuit board and said neck of said video display, said socket unit forming an aperture, wherein said fastening unit is received by said aperture of said socket unit and said orifice of said video circuit board to thereby couple said neck of said video display to said video circuit board.

3. The device of claim 1, said video display corresponding to a cathode ray tube.

4. The device of claim 1, said coupling of said neck cap to said neck of said video display being performed when at least one aperture formed by said neck cap receives said at least on neck terminal.

5. The device of claim 4, said at least one aperture supporting said at least one neck terminal.

6. The device of claim 1, said neck cap forming at least one aperture receiving said at least one neck terminal.

7. The device of claim 1, wherein said fastening unit formed on said guide flange further comprises a first and a second fastening snap formed at a first and a second snap piece respectively, said first and second snap piece being divided by a first and a second splitting groove formed in said guide flange.

8. The device of claim 7, wherein said pair of fastening snaps include rims engaging said video circuit board.

9. The device of claim 1, wherein said fastening unit includes rims engaging said video circuit board.

10. The device of claim 1, wherein said video circuit board is separated from said neck of said video display by closing up said fastening unit.

11. The device of claim 7, wherein said video circuit board is separated from said neck of said video display by pressing said first fastening snap toward said second fastening snap to disengage said fastening unit from said video circuit board.

12. A device comprising:

a video display having a first side conveying varying visual information to a user and having a second side forming a neck, said second side being opposite to said first side;

a plurality of neck terminals being mounted at said neck and being electrically conductive;

a video circuit board having at least one electronic component mounted thereon and forming a first orifice and a first plurality of apertures;

a socket unit being coupled to said video circuit board, said socket unit being disposed between said video circuit board and said neck of said video display, said socket unit forming a second orifice in center of said socket unit and forming a second plurality of apertures, said second orifice being aligned with said first orifice;

a plurality of connecting pins being mounted at said socket unit and being electrically conductive, said connecting pins being received by said first plurality of apertures of said video circuit board and being electrically coupled to said at least one electronic component of said video circuit board;

a neck cap being coupled to said neck of said video display, said neck cap forming a third plurality of apertures and forming a cavity in center of said neck cap, said third plurality of apertures receiving said plurality of neck terminals mounted at said neck;

a guide flange formed on said neck cap; and a fastening unit formed on said guide flange, said fastening unit being received by said first and second orifices to thereby couple said neck of said video display to said video circuit board, said second plurality of apertures of said socket unit receiving said plurality of neck terminals, said neck terminals being electrically coupled to said plurality of connecting pins and being thereby electrically coupled to said at least one electronic component of said video circuit board, wherein said video circuit board is hooked by said fastening unit.

13. The device of claim 12, wherein said fastening unit is formed to enable said neck and said video circuit board to be coupled to one another and also to be not coupled to one another.

14. The device of claim 12, wherein said guide flange aids in supporting a mass of said video circuit board.

15. A device comprising:

a video display having a first side conveying varying visual information to a user and having a second side forming a neck;

at least one neck terminal being mounted at said neck and being electrically conductive;

a video circuit board having at least one electronic component mounted thereon and forming an orifice;

a socket unit being coupled to said video circuit board adjacent to said orifice of said video circuit board;

a neck cap being coupled to said neck of said video display and being disposed between said neck and said video circuit board, said neck cap including at least one aperture receiving said at least one neck terminal;

a guide flange formed on said neck cap; and a fastening unit formed on said guide flange, said fastening unit being received by said orifice of said video circuit board to thereby couple said neck of said video display to said video circuit board, said at least one neck terminal being electrically coupled to said at least one electronic component of said video circuit board, wherein said fastening unit is received by said socket unit.

16. The device of claim 15, wherein said socket unit is disposed between said video circuit board and said neck of said video display.

17. The device of claim 15, wherein said video circuit board is disposed between said socket unit and said neck of said video display.

18. The device of claim 15, wherein said fastening unit is formed to enable said neck to be coupled to said video circuit board and is formed to enable said neck to be not coupled to said video circuit board.

19. The device of claim 15, wherein said guide flange aids in supporting a mass of said video circuit board.

20. The device of claim 15, wherein said fastening unit formed on said guide flange further comprises a first and a second fastening snap formed at a first and a second snap piece respectively, said first and second snap piece being divided by a first and a second splitting groove formed in said guide flange.

* * * * *